Feb. 2, 1926.

H. C. PFEIL 1,571,689

PATTERN FOR SNAP MOLDING

Filed May 23, 1925

Inventor
Henry C. Pfeil

Patented Feb. 2, 1926.

1,571,689

UNITED STATES PATENT OFFICE.

HENRY C. PFEIL, OF CHICAGO HEIGHTS, ILLINOIS, ASSIGNOR TO AMERICAN MANGANESE STEEL COMPANY, OF CHICAGO, ILLINOIS, A CORPORATION OF MAINE.

PATTERN FOR SNAP MOLDING.

Application filed May 23, 1925. Serial No. 32,255.

*To all whom it may concern:*

Be it known that I, HENRY C. PFEIL, a citizen of the United States, residing at Chicago Heights, in the county of Cook and State of Illinois, have invented certain new and useful Improvements in Patterns for Snap Molding, of which the following is a specification.

This invention relates to that class of foundry work in which, for the sake of facilitating and cheapening production, patterns for a plurality of objects to be cast are each divided, on some suitable plane of subdivision, into two members which are placed in registry upon opposite sides of a so-called snap board so that a mold having appropriate cavities for all of the patterns can be prepared simultaneously by introducing the snap board with its applied pattern members, in between the cope and drag sections of the suitably filled flask, and then forcing the flask sections toward each other by means of a hydraulic press or its equivalent until the sections are arrested by the protruding portion of the snap board. The liability of a snap board, when used for the purpose stated, to warp, check, or otherwise deform itself under alternate moistening and drying, changes of temperature, and other conditions which it must encounter, both in use and while stored away, has long been recognized, and these conditions have heretofore been met by various selections of material used in making the snap board, for instance, mahogany or other woods having a texture which reduces to a minimum the liability to deform, and aluminum or other metal or even bakelite or other materials not susceptible to deforming influences; but all these materials add such expense to the production of the patterns as to preclude the application of snap board molding to many cheap articles of manufacture.

The present invention teaches the use, in snap board foundry work, of a very cheap, readily available, and highly efficient material, namely, ply board built up of relatively thin veneers or plies of wood glued together with the grain of the wood extending alternately in directions substantially at right angles one to another, so that moisture encountered from the sand of the mold, which tends to curl one lamina in one direction, will be resisted by the grain running transversely to the direction of curling; the pressure of the sand unequally upon the board, which, heretofore, in the use of a solid board, tended to cause the board to warp transversely of the grain, will now be resisted by lamina running transversely; tendency of the board to warp by reason of unequal support at the sides and ends during the pressing operation will be resisted by the material number of lamina having a grain bridging the points of support; and, withal, a board is produced which is superior to boards of wood as heretofore used, with respect to penetration of moisture, since the veneeer board will preferably be built up by the use of glue or adhesive, which is waterproof.

In order that the invention may be understood, an illustrative example is shown in the accompanying drawing, wherein—

1 represents the upper platen of a mold press, and 2 the movable bed carried by the plunger 3 thereof. 4 represents the drag section and 5 the cope section of a mold containing, respectively, their packings 6 and 7 of sand, and 8 represents a snap board interposed between the sections 4 and 5, having mounted upon it pattern sections 9 and 10 in accordance with the usual practice of snap board molding.

Figure 1:
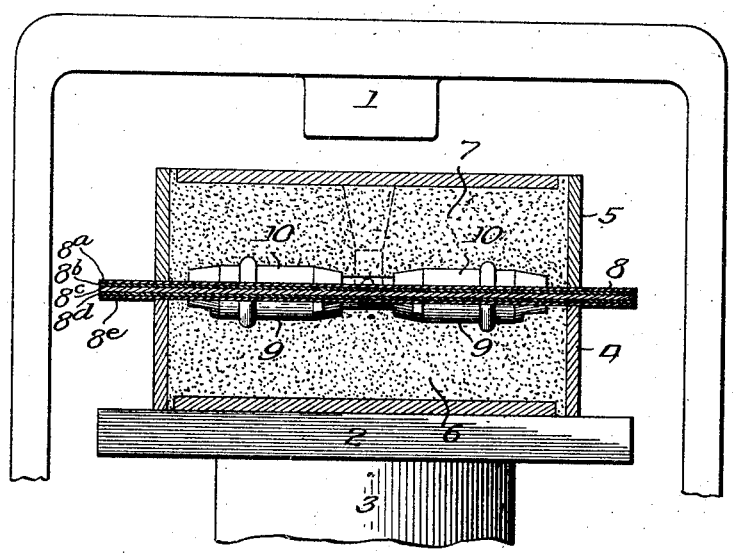
Figure 1 is an elevational view of opposing elements of a mold press, having located therein a mold and snap board pattern in vertical section.
Figure 2:
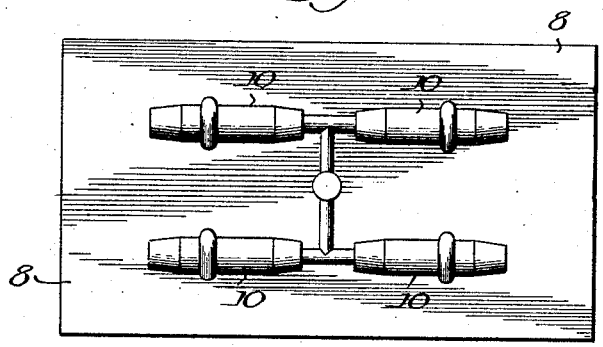
Figure 2 is a plan view of one side of the snap board with its half patterns mounted thereon.

In accordance with the present invention, the snap board 8, as shown in section in Figure 1, is of multiple ply or veneer board construction, the laminæ $8^a$, $8^b$, $8^c$, $8^d$, and $8^e$ of which are placed with their grains running alternately in directions transverse one to another, with the result that the board 8 has a capacity of developing a rigid nonyielding bridge from side to side of the mold, as well as from end to end thereof, and to thereby resist any tendency to deform the board transversely to its length, or lengthwise as a result of uneven pressure that may be brought upon it by the sand during the pressing operation, and at the same time enabling the board to resist any deforming tendency resulting from absorption of moisture at one surface or the other, or unequal heating effect, or, in short, any influence which it is liable to encounter either when being used or stored.

As compared with mahogany or other woods having a grain which has heretofore recommended them for use in producing the board of snap board patterns, ply board is much better structurally and is so much cheaper in price that it renders the snap board system of foundry work available for many cheap articles where the cost of the mold has heretofore been regarded as prohibitive.

I claim:

1. In foundry work, a snap board pattern, comprising a board composed of a plurality of plies of wood arranged with their grain extending alternately at substantial angles one to another, and pattern sections mounted upon said board.

2. In combination with a mold comprising flask sections, a snap board extending in relation to be supported by sides as well as ends of the flask sections; said snap board being composed of wooden laminæ arranged with the grain of the wood of the respective lamina extending alternately from end to end and side to side of the flask sections, thereby providing cross grain bridging members in each direction of support.

3. In a snap board pattern for molding, a board comprising a plurality of laminæ of wood arranged with their grain alternately in different directions; said laminæ being intimately united throughout to provide a solid laminated structure, and pattern sections being secured to the outer lamina of the board structure.

Signed at Chicago Heights, Illinois, this 14th day of May, 1925.

HENRY C. PFEIL.